United States Patent
Suzuki et al.

(10) Patent No.: US 6,360,151 B1
(45) Date of Patent: Mar. 19, 2002

(54) ELECTRIC POWER STEERING UNIT AND METHOD FOR VEHICLE

(75) Inventors: Toru Suzuki, Seto; Yoshiaki Suzuki, Shizuoka-ken, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/671,257

(22) Filed: Sep. 28, 2000

(30) Foreign Application Priority Data

Oct. 19, 1999 (JP) .......................................... 11-296176

(51) Int. Cl.$^7$ .............................. H02P 7/14; B62D 6/00; B62D 5/04
(52) U.S. Cl. .......................... 701/41; 180/446; 318/432
(58) Field of Search ............................ 701/41; 180/446, 180/443, 400, 412, 413; 318/432, 433, 430, 434

(56) References Cited

U.S. PATENT DOCUMENTS

| | | | |
|---|---|---|---|
| 5,600,559 A | * 2/1997 | Nishimoto et al. | ... 364/424.051 |
| 5,839,537 A | * 11/1998 | Nishino et al. | ............. 180/443 |
| 6,013,994 A | * 1/2000 | Endo et al. | .................. 318/432 |
| 6,070,692 A | * 6/2000 | Nishino et al. | ............. 180/443 |
| 6,129,172 A | * 10/2000 | Yoshida et al. | ............. 180/446 |
| 6,161,068 A | * 12/2000 | Kurishige et al. | ........... 180/443 |

FOREIGN PATENT DOCUMENTS

JP      10-157636      6/1998

* cited by examiner

*Primary Examiner*—Tan Nguyen
*Assistant Examiner*—Dalena Tran
(74) *Attorney, Agent, or Firm*—Oliff & Berridge PLC

(57) ABSTRACT

An electric power steering unit includes an electric motor that applies assisting force with respect to a rotating operation of the steering wheel. In one embodiment, the steering torque TM detected by a steering torque sensor is converted into a command current value I* for the electric motor by a controller. The controller controls the driving of the electric motor in accordance with the command current value I*. The controller can calculate a differential value of the steering torque TM. Based on the calculated differential value, the inertia compensation control amount TM' is added to the steering torque TM, thus reducing the steering operation load of the steering wheel at the start of a steering operation. The steering speed also can be detected. The inertia compensation control amount TM' can be decreased with an increase in detected steering speed, thus avoiding an uncomfortable steering feel due to the difference in the steering speeds.

23 Claims, 5 Drawing Sheets

ELECTRIC POWER STEERING UNIT AND METHOD FOR VEHICLE

INCORPORATION BY REFERENCE

The disclosure of Japanese Patent Application No. 11-296176 filed on Oct. 19, 1999, including the specification, drawings and abstract is incorporated herein by reference in its entirety.

BACKGROUND OF THE INVENTION

1. Field of the Invention

The invention relates to an electric power steering unit for a vehicle, which assists steering operations of a steering wheel by the rotating operation of an electric motor and to methods for controlling the steering unit.

2. Description of Related Art

An electric power steering unit for a vehicle is disclosed in Japanes Patent Application Laid-Open No. 10-157636, which applies an assisting force with respect to the rotating operation of a steering wheel by controlling the rotational force of an electric motor in accordance with the detected steering torque. This unit serves to compensate for insufficiency of the assisting force caused by an inertia force of the electric motor at the start of a rotating operation of the steering wheel or the steering torque due to friction. This can be done by adding controlled amount, corresponding to the differential value differentiated by the steering torque, to the steering torque that otherwise would be provided.

In the aforementioned electric power steering unit, the faster the steering wheel is rotatively operated, the more the steering assisting force by the electric motor is increased because of an increase in the differential value of the steering torque. Accordingly, the driver may receive substantially different reaction forces with respect to a steering operation depending on whether the steering wheel is rotated at low speeds or at high speeds. Such difference in the steering reaction force received by the driver may deteriorate the steering feel for the driver. A reverse rotating operation of the steering wheel may generate a state where two control amounts corresponding to the steering torque and the differential value of the steering torque have opposite signs, each acting in opposite directions. Therefore the driver does not feel the reaction force which is expected to be felt from a normal steering operation of the steering wheel, or the operated steering wheel may return to the original position rapidly. In this case as well, good steering feel may not be obtained.

SUMMARY OF THE INVENTION

The invention has been made in view of the foregoing disadvantages of the related art. It is an object of the invention to provide an electric power steering unit that maintains good steering feel for the driver. The electric power steering unit according to a first aspect of the invention is provided with an electric motor that applies an assisting force with respect to a rotating operation of a steering wheel, a steering torque detector that detects a steering torque, and a controller that generates an initial inertia compensation control amount to offset the inertia force of the electric motor. The controller controls the rotational force of the electric motor based on the detected steering torque and a corrected initial inertia compensation control amount. The controller corrects the initial inertia compensation control amount in accordance with a detected steering speed of the steering wheel.

According to the first aspect of the invention, the controller corrects the initial inertia compensation control amount to offset the inertia force of the electric motor in accordance with the steering speed of the steering wheel that has been detected by a steering speed detector. This controller can, for example, correct the initial inertia compensation control amount to decrease with an increase in the detected steering speed of the steering wheel. This makes it possible to solve the problem of deterioration of the steering feel resulting from a variable rotating speed of the steering wheel, thus maintaining good steering feel for the driver.

In the above case, the steering speed of the steering wheel may be detected in accordance with outputs from a sensor that detects the rotating angle of the steering wheel, which is attached to the steering shaft. Alternatively, it is also possible to obtain the steering speed by calculation based on the terminal voltage of the electric motor that rotates integrally with the steering wheel and the drive current for the electric motor. According to this method, the aforementioned sensor can be omitted, thus reducing the cost for manufacturing the electric power steering unit.

An electric power steering unit according to a second aspect of the invention includes a controller that limits the inertia compensation control amount when the detected steering torque and the inertia compensation control amount are acting in opposite directions. According to this aspect of the invention, the steering torque and the inertia compensation control amount will never offset each other during a reverse steering operation of the steering wheel. Therefore, the driver never feels a lack of reaction force from a steering operation of the steering wheel, and rapid motion of the returning steering wheel is prevented, thus maintaining good steering feel for the driver.

BRIEF DESCRIPTION OF THE DRAWINGS

The foregoing and other objects, features and advantages of the invention will become apparent from the following description with reference to the accompanying drawings in which like reference numerals refer to like elements and wherein.

DETAILED DESCRIPTION OF PREFERRED EMBODIMENTS

Figure 1:
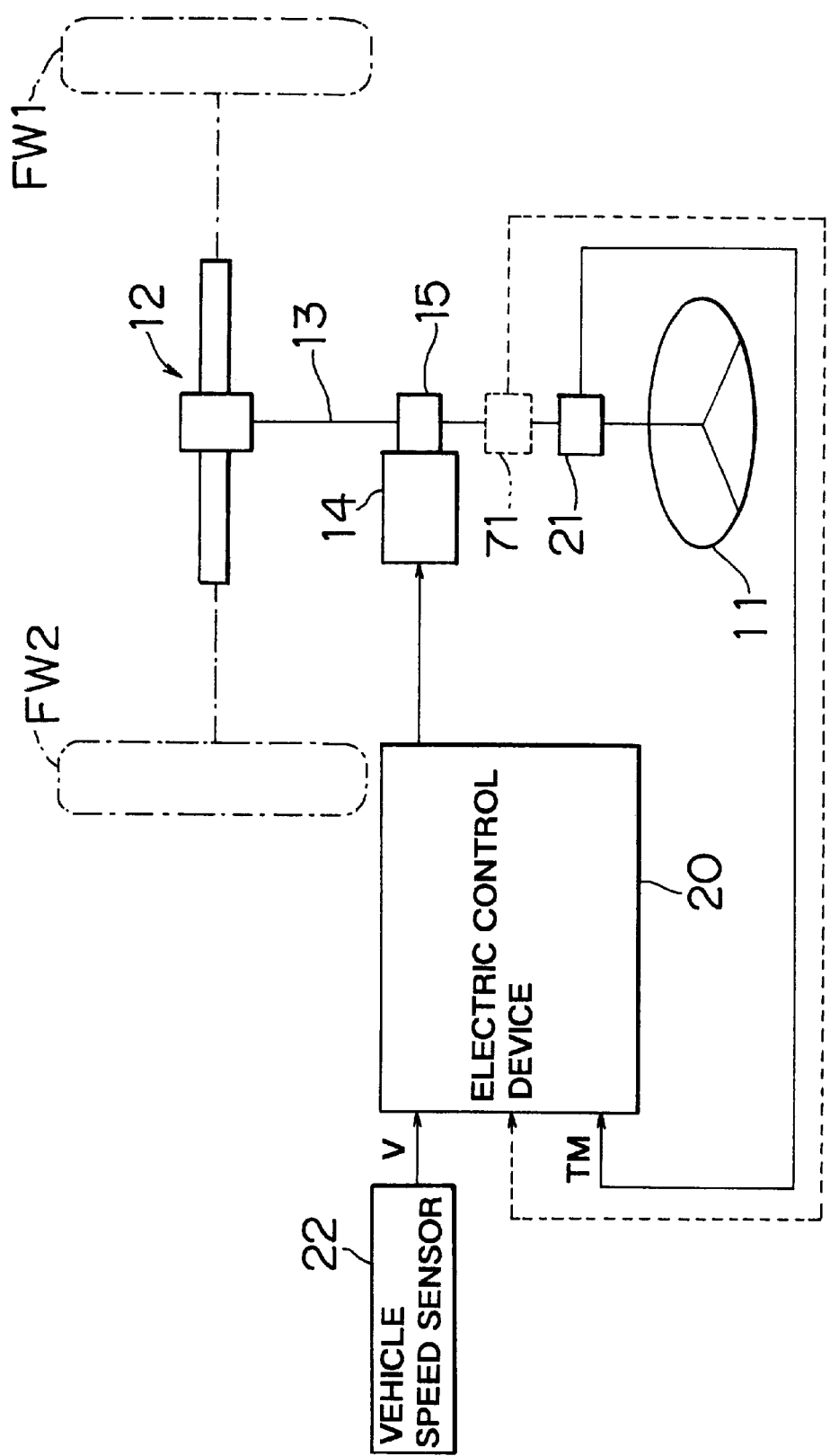
FIG. 1 is a schematic illustration showing the structure of an electric power steering unit according to one embodiment of the invention.

An embodiment of the present invention will be described referring to the drawings. FIG. 1 schematically shows an electric power steering unit for a vehicle according to this embodiment.

The electric power steering unit is provided with an electric motor 14 attached to a steering shaft 13 that transmits a rotating operation of a steering wheel 11 to left and right front wheels FW1, FW2 via a rack and pinion mechanism 12. This electric motor 14 is a d.c. motor and applies an assisting force with respect to the rotating operation of the steering wheel 11 in accordance with the rotation thereof. This rotation is transferred to the steering shaft 13 via a reduction unit 15.

An electric control device 20 is electrically connected to the electric motor 14 so as to control the rotating operation thereof in accordance with detection outputs from a steering torque sensor 21 and a vehicle speed sensor 22. The steering torque sensor 21 is attached to the steering shaft 13 and detects a steering torque (steering reaction force) TM that acts on the steering wheel 11 and the steering shaft 13 during a steering operation of the steering wheel 11. Steering torque TM generated in the steering wheel 11 and the steering shaft 13 when rotating the steering wheel 11 clockwise will have a positive sign. Meanwhile, steering torque TM generated in the steering wheel 11 and the steering shaft 13 when rotating the steering wheel 11 counterclockwise will have a negative sign. The vehicle speed sensor 22 detects a vehicle speed V.

Figure 2:
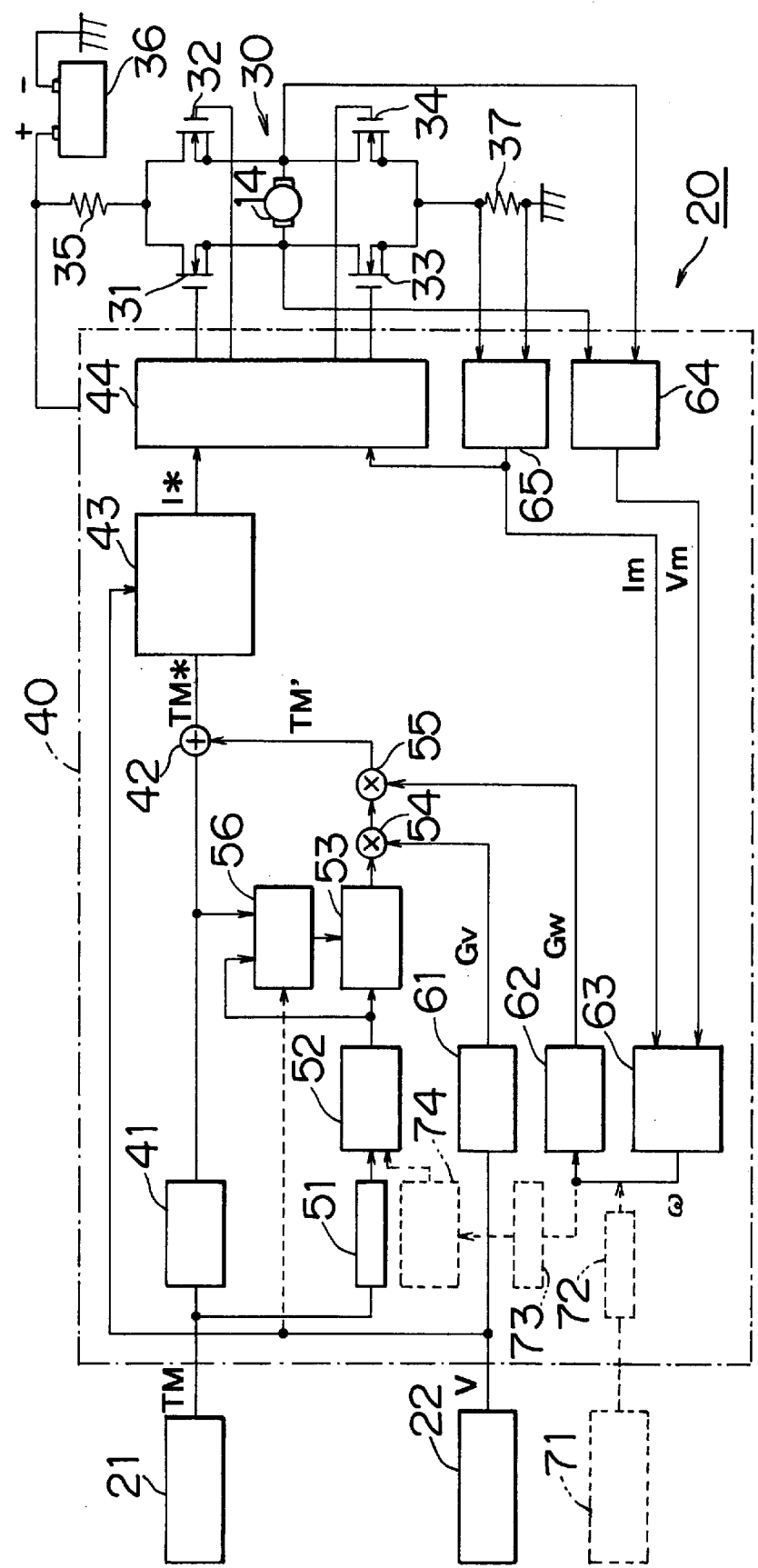
FIG. 2 is a detailed block diagram of the electric control device shown in FIG. 1.

Referring to FIG. 2, the electric control device 20 is composed of a drive circuit 30 for driving the electric motor 14 and a control circuit unit 40 for controlling the drive circuit 30. The drive circuit 30 is formed of a bridge circuit defined by four switching elements 31 to 34 each in the form of, for example, a FET. One of a pair of opposing terminals of the switching elements 31, 32 are connected to a positive voltage terminal (+) of a battery 36 via a shunt resistance 35. A negative voltage terminal (−) of the battery 36 is grounded. One of a pair of opposing terminals of switching elements 33, 34 are grounded via a shunt resistance 37. The other terminals of the switching elements 31 through 34 are connected to both terminals of the electric motor 14, respectively.

The control circuit unit 40 is formed of a micro-computer and its peripheral circuits, and is activated upon receipt of power supplied from the battery 36. This control circuit unit 40 realizes the various described functions by programming, which are represented with the function block diagram in FIG. 2.

The steering torque TM detected by the steering torque sensor 21 is input to a drive control portion 44 via a phase compensation portion 41, adder portion 42 and a torque-command current value conversion portion 43. The phase compensation portion 41 serves to prevent the steering system operation from becoming unstable due to vibration, which advances the phase of elements at a predetermined frequency band (for example, approximately 10 to 30 Hz) contained in the signal indicating the steering torque TM. The torque-command current value conversion portion 43 converts an input command torque TM* into a command current value I* to be output in accordance with characteristics based on the vehicle speed V detected by the vehicle speed sensor 22 using a conversion table or operation processing. Referring to the graph of FIG. 3, the above conversion characteristics are set such that the command current value I* increases with an increase in the input command torque TM* and decreases with an increase in the vehicle speed V.

The drive control portion 44 calculates I*−Im, the difference between the command current value I* and the drive current Im of the motor 14 detected by a current detection portion 65 (described later), which is input for feedback control. It forms a control signal under PID control using the calculated difference I*−Im. The drive control portion 44 has a pulse width modulation (PWM) function for supplying pulse width modulated pulse string signals in accordance with the control signal to switching elements 31 to 34 to be turned ON/OFF. The drive current Im equivalent to the command current value I* is applied to the electric motor 14 to generate torque equivalent to the command torque TM*. The electric motor 14 normally rotates to assist clockwise steering of the steering wheel 11 when the switching elements 31, 34 are controlled ON/OFF. The electric motor 14 reversely rotates to assist counterclockwise steering of the steering wheel 11 when the switching elements 32, 33 are controlled ON/OFF.

An adder portion 42 receives inputs of the phase compensation steering torque TM and the inertia compensation control amount TM' for offsetting the inertia force of the electric motor 14. The adder portion 42 outputs the sum of the steering torque TM and the inertia compensation control amount TM', that is, TM+TM', as the command torque TM*.

Figure 4:
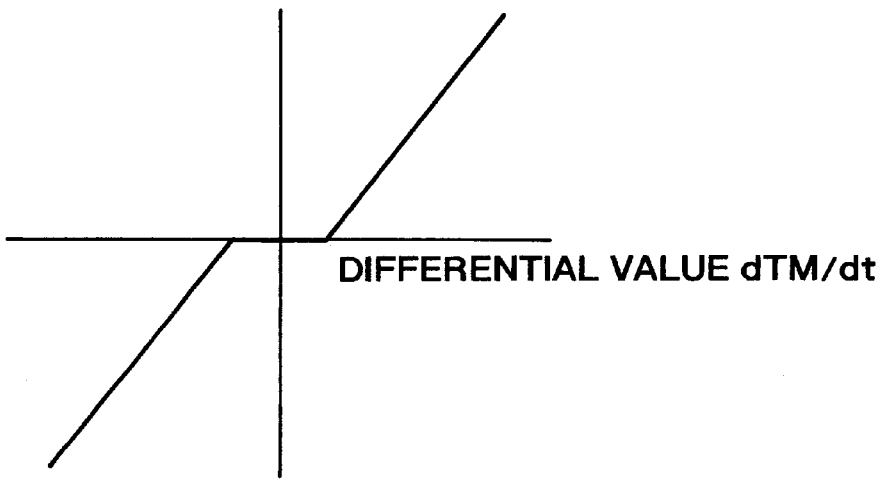
FIG. 4 is a graphical representation showing the relation between differential value of the steering torque and inertia compensation control amount.

The inertia compensation control amount TM' is generated by a differential portion 51 and a control amount determination portion 52, which is supplied to the adder portion 42 via a limit portion 53 and multiplier portions 54, 55. The differential portion 51 differentiates the steering torque TM from the steering torque sensor 21 to output the differential value dTM/dt. The control amount determination portion 52 converts the input differential value dTM/dt into the inertia compensation control amount TM' to be output using a conversion table or operation processing. Referring to the graph shown in FIG. 4, the conversion characteristics are set such that the inertia compensation control amount TM' increases with an increase in the input differential value dTM/dt.

The limit portion 53 limits the inertia compensation control amount TM' from the control amount determination portion 52 in accordance with the judgment results from a limit condition judgment portion 56. The limit condition judgment portion 56 limits the inertia compensation control amount TM' by supplying a limit command signal to the limit portion 53 when the steering torque TM and inertia compensation control amount TM' act in opposite directions. That is, the limit condition judgment portion 56 outputs limit command signals when the steering torque TM is greater than a positive predetermined value $TM_0$ and the inertia compensation control amount TM' is negative, or when the steering torque TM is smaller than a negative predetermined value $-TM_0$ and the inertia compensation control amount TM' is positive. The limit portion 53 limits the inertia compensation control amount TM' by supplying the limit command signal "0" to the multiplier portion 54. When no limit command signal is supplied, the input inertia compensation control amount TM' is supplied directly to the multiplier portion 54.

Figure 5:
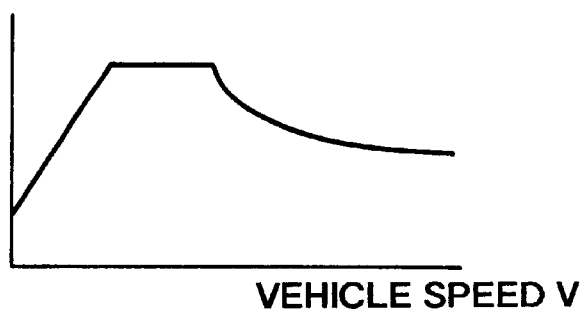
FIG. 5 is a graphical representation showing the relation between the vehicle speed and the vehicle speed gain.

The multiplier portion 54 multiplies the inertia compensation control amount TM' provided from the limit portion 53 with a vehicle speed gain Gv supplied from a gain operation portion 61 and outputs the multiplied value. The gain operation portion 61 outputs the vehicle speed gain Gv that varies in accordance with the vehicle speed V detected by the vehicle speed sensor 22 by using a conversion table or operation processing. Referring to FIG. 5, for example, the vehicle speed gain Gv is characterized by the fact that it increases with an increase in the vehicle speed V in the low vehicle speed range and decreases with an increase in the vehicle speed in the mid and high speed ranges.

Figure 6:
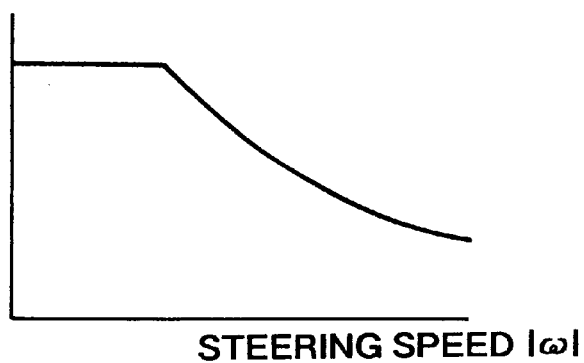
FIG. 6 is a graphical representation showing the relation between the steering speed (motor rotational angular velocity) and the steering speed gain.

The multiplier portion 55 multiplies the inertia compensation control amount TM' supplied from the multiplier portion 54 with the vehicle steering speed gain Gw supplied from the gain operation portion 62. The gain operation portion 62 receives the steering speed ω from a steering speed operation portion 63 and outputs the steering speed gain Gw that varies in accordance with the absolute value |ω| of the steering speed ω by the conversion table or operation processing. The steering speed gain Gw is characterized, for example, by the fact that it decreases with an increase in the steering speed ω as shown in FIG. 6. The steering speed ω indicates the rotational velocity of the steering wheel 11, which is equivalent to the rotational angular velocity of the electric motor 14 that rotates integrally with the steering wheel 11. The steering speed operation portion 63 calculates the steering speed of the steering wheel 11 (the rotational angular velocity of the electric motor 14) by executing the operation of the following equation using the voltage Vm between terminals of the electric motor 14 and drive current Im.

$$\omega = (Vm - Rm \times Im)/K \quad (1)$$

The above equation (1) is used for obtaining the rotational angular velocity of the d.c. motor considering no inductance (because it is usually negligible), in which Rm and K are constants determined based upon the motor.

A voltage detection portion 64 and current detection portion 65 are connected to the steering speed operation portion 63 for detecting the voltage Vm between terminals and the drive current Im so as to execute the above equation (1). The voltage detection portion 64 receives the voltages at both terminals of the electric motor 14, and outputs the signal by detecting the voltage between terminals of the electric motor 14 based on the voltage difference as described above. The current detection portion 65 receives voltages at both terminals of the shunt resistance 37, and calculates the drive current Im based on the input voltages.

Figure 3:
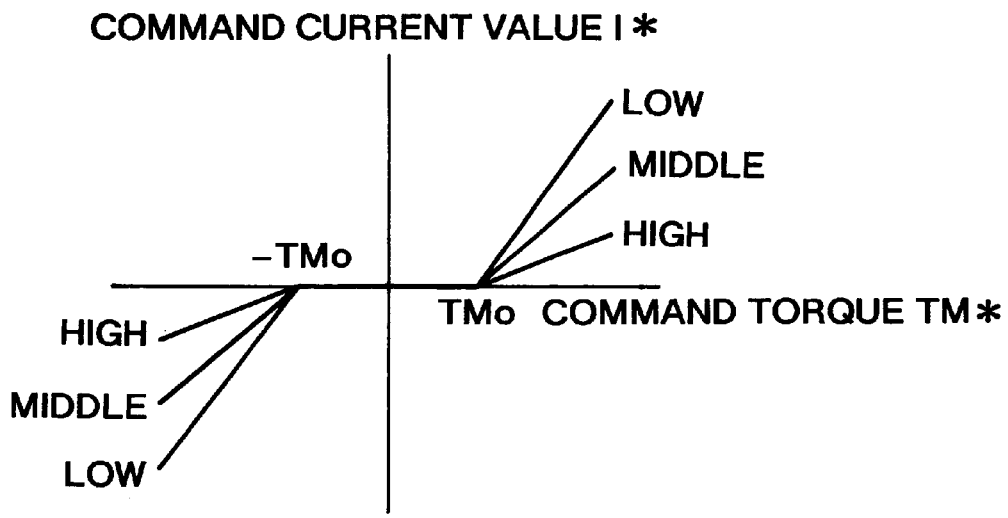
FIG. 3 is a graphical representation showing the relation between command torque and command current value.

The operation of the above-structured embodiment will be described. In response to a rotating operation of the steering wheel by the driver, steering torque (steering reaction force) TM is generated in the steering wheel 11 and the steering shaft 13. The steering torque sensor 21 then detects this steering torque TM. The steering torque TM is supplied to the torque-command current value conversion portion 43 via the phase compensation portion 41 and the adder portion 42 as the command torque TM*. The torque-command current value conversion portion 43 is characterized by the fact that it varies the supplied command torque TM* in accordance with the vehicle speed V, which is further converted into the command current value I* (FIG. 3). The converted command current value I* is supplied to the drive control portion 44. Then the drive control portion 44 applies a drive current Im equivalent to the command current value I* to the electric motor 14 through ON/OFF control of the switching elements 31 to 34 in the drive circuit 30 based on the command current value I* and the drive current value Im detected by the current detection portion 65.

As a result, the electric motor 14 assists the steering shaft 13 to rotate at a torque equivalent to the command torque TM*. Accordingly, a rotating operation of the steering wheel 11 by the driver can be assisted in accordance with the detected steering torque TM. This allows the driver who feels appropriate steering reaction force to rotate the steering wheel 11 for steering left and right front wheels FW1, FW2.

In this case, since the torque-command current value conversion portion 43 is set such that the command current value I* decreases following an increase in the vehicle speed V, the steering assisting force of the electric motor 14 becomes large at low vehicle running speeds and small at high vehicle running speeds. Therefore, the steering wheel 11 can be smoothly rotated even at low running speeds. Meanwhile, it can be rotated stably at high running speeds.

In the steering assisting control, the inertia compensation control amount TM' is added to the steering torque TM in the adder portion 42. The inertia compensation control amount TM' is determined by the differential portion 51 and the control amount determination portion 52 and is set so as to increase following an increase in the differential value dTM/dt of the steering torque TM. Even when the inertia force of the electric motor is large or the friction among various portions is large at the start of a rotating operation of the steering wheel 11, the steering reaction force can be reduced. This allows the driver to start a rotating operation of the steering wheel 11 smoothly.

The inertia compensation control amount TM' added to the steering torque TM is corrected by the gain operation portion 62 and the multiplier portion 55 such that it becomes small with an increase in the absolute value |ω| of the steering speed ω of the steering wheel 11. This may prevent an increase in the inertia compensation control amount TM' even when the differentiated value dTM/dt of the steering torque TM becomes large by quick rotation of the steering wheel 11. This allows the driver who feels appropriate steering reaction force to perform a rotating operation of the steering wheel 11 in just the same manner as a slow steering operation of the steering wheel 11. As a result, this may prevent deterioration of the steering feel due to the rotating speed of the steering wheel 11, thus maintaining excellent steering feel for the driver.

In this case, the steering speed operation portion 63 calculates the steering speed (rotational angular velocity of the electric motor 14) ω of the steering wheel using the voltage Vm between terminals of the electric motor 14 that has been detected by the voltage detection portion 64 and the drive current Im of the electric motor 14 that has been detected by the current detection portion 65. As this eliminates sensors for detecting actual rotating angle and rotational angular velocity of the steering wheel 11, the cost for manufacturing the electric power steering system of this embodiment can be reduced.

The inertia compensation control amount TM' to be added to the steering torque TM is corrected so as to increase with an increase in the vehicle speed V in the low vehicle speed range by the vehicle speed sensor 22, gain operation portion 61 and multiplier portion 54. Meanwhile it is corrected so as to decrease with an increase in the vehicle speed V in the mid and high vehicle speed range. This correction may allow the driver to perform steering operation of the steering wheel 11 smoothly at the low vehicle speed and to perform steering operation of the steering wheel 11 while feeling appropriate steering reaction force at the mid and high vehicle speed range.

The inertia compensation control amount TM' output from the control amount determination portion 52 can be limited to "0" when steering torque TM and the inertia compensation control amount TM' act in opposing directions by the control portion 53 and the limit condition judgment portion 56. This limitation makes it possible to prevent the steering torque TM and the inertia compensation control amount TM' from offsetting each other even during a reverse steering operation. Therefore, the driver is able to receive the reaction force with respect to a steering operation of the steering wheel 11 in just the same manner with a normal steering operation. The rapid return operation of the steering wheel can be eliminated, thus maintaining excellent steering feel.

Figure 7:
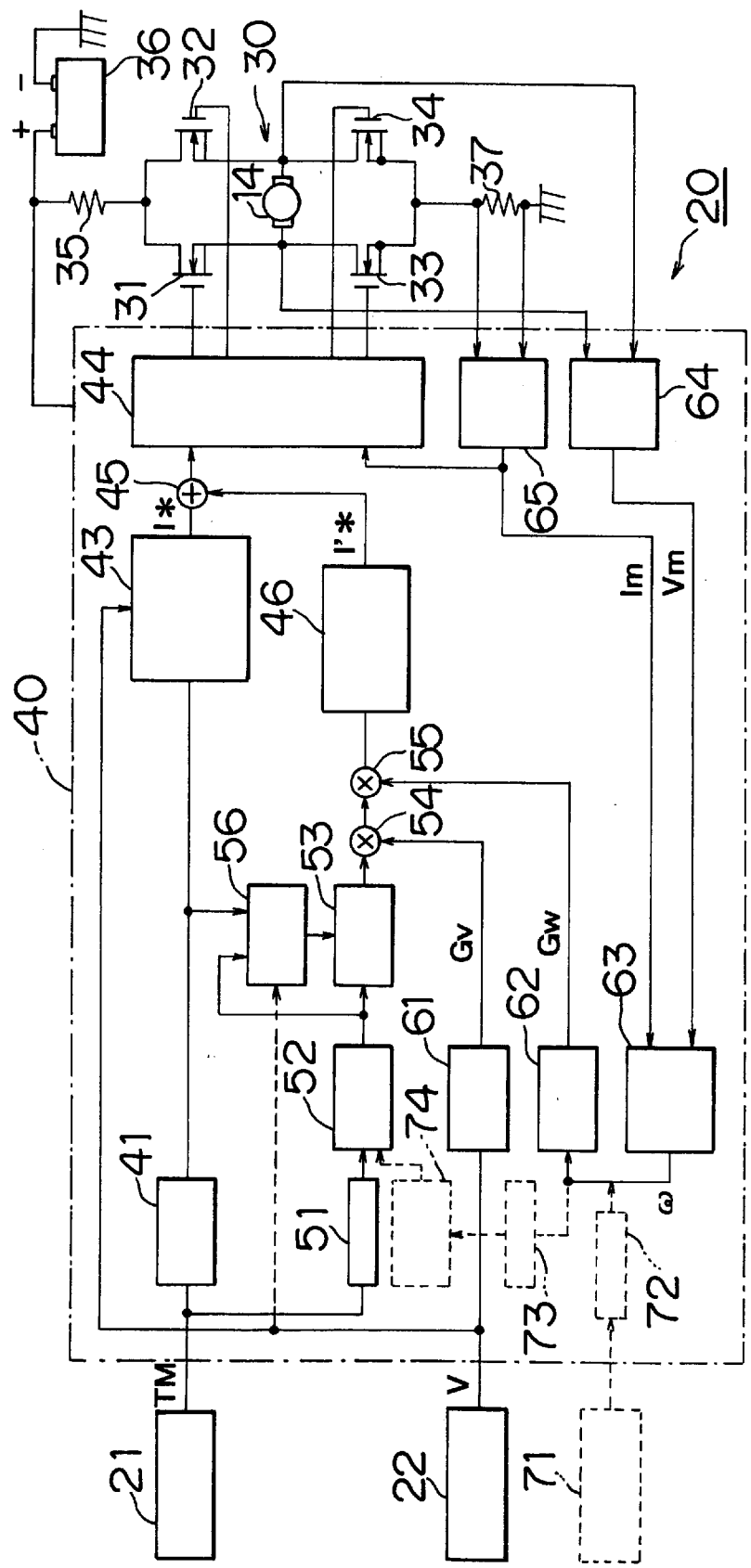
FIG. 7 is a detailed block diagram of a modified example of the electric control device shown in FIG. 1.

In the aforementioned embodiment, the inertia compensation control amount TM' supplied from the multiplier portion 55 is added to the steering torque TM supplied to the torque-command current conversion portion 43 in the adder portion 42 placed at the stage before the conversion portion 43. Alternatively, as shown in FIG. 7, it may be structured so as to place the adder portion 45 at the stage after the torque-command current conversion portion 43 such that the inertia compensation control amount TM' from the multiplier portion 55 is added to the command current value I* output from the conversion portion 43. In this case, the inertia compensation control amount TM' corresponds to the steering torque TM. Preferably, a torque-current conversion portion 46 is provided to convert the inertia compensation control amount TM' into an inertia compensation control amount I'* corresponding to the command current value I* such that the inertia compensation control amount TM' influences the speed control of the electric motor 14 in the same way as in the aforementioned embodiment. When necessary, the vehicle speed V from the vehicle speed sensor 22 is input to the torque-current conversion portion 46 so as to change the conversion characteristics in accordance with the vehicle speed V. In the modified example as described above, the torque-current conversion portion 46 may be replaced with the control amount determination portion 52 by which the inertia compensation control amount I'* corresponding to the command current value I* is determined.

In this embodiment, the steering speed operation portion 63 obtains a steering speed (rotational angular velocity of the electric motor 14) ω of the steering wheel 11 by operation using the voltage between terminals of the electric motor 14 and the drive current Im. However, as the dashed lines of FIGS. 1 and 2 show, the steering speed operation portion 63 may be replaced with a steering angle sensor 71 provided on the steering shaft 13 for detecting the rotational angle thereof. The rotational angle detected by the sensor 71 is differentiated by the differentiating portion 72 placed within the control circuit unit 40 so as to detect the steering speed of the steering wheel 11. The steering angle sensor 71 may be replaced with a steering speed sensor provided on the steering shaft 13 for directly detecting the rotational angular velocity thereof, which eliminates the need for the differentiating portion 72.

In the present embodiment, the inertia compensation control amount TM' is determined in accordance with the steering torque detected by the steering torque sensor 21. However, the inertia compensation control amount TM' may be determined in accordance with the rotational angular acceleration ω' of the electric motor 14. In this case, as the dashed line of FIG. 2 shows, the rotational angular velocity (steering speed of the steering wheel 11) ω of the electric motor 14 from the steering speed operation portion 63 or from the differentiating portion 72 is differentiated by the differentiating portion 73. Then inertia force determining portion 74 determines the rotational angular acceleration ω' (=dw/dt), and then the inertia force Fm of the electric motor 14 by executing the operation indicated by equation (2).

$$Fm = Im \times \omega' \qquad (2)$$

where Im indicates the inertia moment of the electric motor 14. In this case, the inertia force Fm is applied to the control amount determination portion 52 that uses the inertia force Fm instead of the differentiated value dTM/dt of the above steering torque TM, thus providing the inertia compensation control amount TM'. By this operation, the effect differentiated by the inertia compensation control amount TM' is expected to be similar to that of the aforementioned embodiment.

In the aforementioned embodiment, when the steering torque TM and the inertia compensation control amount TM' act in opposing directions, the output value from the limit portion 53 is limited to "0". Alternatively, the output value may be limited to a predetermined lower limit value and upper limit value range other than "0". That is, when establishment of the aforementioned limit conditions is judged by the limit condition judgment portion 56, the inertia compensation control amount TM' output from the control amount determination portion 52 is guarded so as to be output in the range between the lower limit value and the upper limit value. Otherwise, the inertia compensation control amount TM' output from the control amount determination portion 52 may be directly output. In this case, it is expected to obtain the same effect as that obtained by limitation of the inertia compensation control amount TM'.

In the present embodiment, the limitation of the inertia compensation control amount TM' is set at an arbitrary vehicle speed V. Alternatively, the limitation may be set only in the case where the vehicle speed V is within a predetermined vehicle speed range. For example, in a state where the vehicle is stopped or the vehicle speed is substantially low, the driver hardly feels reaction force with respect to the steering force during a reverse rotating operation of the steering wheel compared with the case of a normal rotating operation of the steering wheel. Therefore, the inertia compensation control amount TM' may be limited only at times other than when the vehicle is stopped or running at substantially low speeds which are lower than a predetermined speed. The very unnatural feeling from a steering operation when driving the vehicle is only felt in the higher speed range, so the inertia compensation control amount TM' may be limited only in the range where the vehicle speed is higher than a predetermined vehicle speed.

In the illustrated embodiment, the controller (control circuit unit 40) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An electric power steering unit for a vehicle comprising:
   an electric motor which applies an assisting force with respect to a rotating operation of a steering wheel;
   a torque detector which detects a steering torque of the steering wheel;
   a steering speed detector which detects a steering speed of the steering wheel; and
   a rotational force controller that generates an initial inertia compensation control amount to offset an inertia force of the electric motor, corrects the initial inertia compensation control amount in accordance with the steering speed detected by the steering speed detector, and controls a rotational force of the electric motor based on the steering torque detected by the torque detector and the corrected inertia compensation control amount.

2. The electric power steering unit according to claim 1, wherein:
   the controller corrects the initial inertia compensation control amount so as to decrease with an increase in the detected steering speed.

3. The electric power steering unit according to claim 1, wherein:
   the steering speed detector calculates the steering speed of the steering wheel based upon a terminal voltage and a drive current of the electric motor.

4. The electric power steering unit according to claim 1, wherein:
   the controller differentiates the detected steering torque, and generates the initial inertia compensation control amount corresponding to the differential value.

5. The electric power steering unit according to claim 4, wherein:
   the initial inertia compensation control amount generated by the controller decreases as the differentiated value increases.

6. The electric power steering unit according to claim 1, further comprising:
   an angular velocity detector which detects an angular acceleration of the steering wheel, and
   the controller generates the inertia compensation control amount in accordance with the detected angular acceleration.

7. The electric power steering unit according to claim 1, wherein the controller calculates a steering signal by adding the corrected inertia compensation control amount to the detected steering torque, and converts the calculated steering signal into a command current value to command a current amount supplied to the electric motor.

8. The electric power steering unit according to claim 1, wherein the controller converts the detected steering torque into a command current value to command a current amount supplied to the electric motor, and adds a compensation current value to the command current value based on the corrected inertia compensation control amount.

9. The electric power steering unit according to claim 1, wherein the steering speed detector comprises:
   a steering angle detector which detects a steering angle caused by a rotating operation of the steering wheel; and
   a steering speed calculator which calculates the steering speed based on the detected s angle.

10. An electric power steering unit for a vehicle comprising:
    an electric motor which applies an assisting force with respect to a rotating operation of a steering wheel;
    a torque detector which detects a steering torque of the steering wheel; and
    a rotational force controller that generates an inertia compensation control amount to offset an inertia force of the electric motor, controls a rotational force of the electric motor based on the detected steering torque and the generated inertia compensation control amount, and limits the inertia compensation control amount when the detected steering torque and the generated inertia compensation control amount act in opposite directions;
    wherein the rotational force controller inhibits the limiting of the inertia compensation control amount in accordance with vehicle speed.

11. The electric power steering unit according to claim 10, wherein the controller differentiates the steering torque detected by the torque detector, and generates the inertia compensation control amount corresponding to a differential value of the steering torque.

12. The electric power steering unit according to claim 11, wherein the inertia compensation control amount generated by the controller is corrected in accordance with vehicle speed.

13. The electric power steering unit according to claim 10, further comprising:
    an angular velocity detector which detects an angular velocity of the steering wheel under a rotating operation, wherein the controller generates the inertia compensation control amount in accordance with the detected angular velocity.

14. The electric power steering unit according to claim 13, wherein the inertia compensation control amount generated by the controller is corrected in accordance with vehicle speed.

15. The electric power steering unit according to claim 10, further comprising:
    an angular velocity detector which detects a rotational angular velocity of the electric motor, wherein the controller generates the inertia compensation control amount in accordance with the detected rotational angular velocity.

16. The electric power steering unit according to claim 10, wherein the controller calculates the inertia force of the electric motor, and generates the inertia compensation control amount in accordance with the calculated inertia force.

17. The electric power steering unit according to claim 10, wherein the controller calculates a steering signal by adding the inertia compensation control amount to the detected steering torque, and converts the calculated steering signal into a command current value to command a current amount supplied to the electric motor.

18. The electric power steering unit according to claim 10, wherein the controller converts the detected steering torque into a command current value to command a current amount supplied to the electric motor, and adds a compensation current value to the command current value based on the inertia compensation control amount.

19. An electric power steering unit for a vehicle comprising:
    an electric motor which applies an assisting force with respect to a rotating operation of a steering wheel;
    a torque detector which detects a steering torque of the steering wheel; and a rotational force controller that generates an inertia compensation control amount to offset an inertia force of the electric motor, controls a rotational force of the electric motor based on the detected steering torque and the generated inertia compensation control amount, and limits the inertia compensation control amount when the detected steering torque and the generated inertia compensation control amount act in opposite directions;

wherein the rotational force controller limits the inertia compensation control amount when an absolute value of the steering torque is larger than a predetermined torque.

20. An electric power steering unit for a vehicle comprising:

an electric motor which applies an assisting force with respect to a rotating operation of a steering wheel;

a torque detector which detects a steering torque of the steering wheel; and a rotational force controller that generates an inertia compensation control amount to offset an inertia force of the electric motor, controls a rotational force of the electric motor based on the detected steering torque and the generated inertia compensation control amount, and limits the inertia compensation control amount when the detected steering torque and the generated inertia compensation control amount act in opposite directions;

wherein the rotational force controller limits the inertia compensation control amount to zero when the detected steering torque and the generated inertia compensation control amount act in opposite directions.

21. An electric power steering unit for a vehicle comprising:

an electric motor which applies an assisting force with respect to a rotating operation of a steering wheel;

a torque detector which detects a steering torque of the steering wheel; and a rotational force controller that generates an inertia compensation control amount to offset an inertia force of the electric motor, controls a rotational force of the electric motor based on the detected steering torque and the generated inertia compensation control amount, and limits the inertia compensation control amount when the detected steering torque and the generated inertia compensation control amount act in opposite directions;

wherein the rotational force controller limits the inertia compensation control amount to be in a range between a predetermined upper limit and a predetermined lower limit when the detected steering torque and the generated inertia compensation control amount act in opposite directions.

22. A method of controlling an electric motor that applies an assisting force with respect to rotating operation of a steering wheel in an electric power steering unit for a vehicle, the method comprising:

detecting a steering torque of the steering wheel;

detecting a steering speed of the steering wheel;

generating an initial inertia compensation control amount to offset an inertia force of the electric motor;

correcting the initial inertia compensation control amount in accordance with the detected steering speed; and controlling a rotational force of the electric motor based on the detected steering torque and the corrected inertia compensation control amount.

23. A method of controlling an electric motor that applies an assisting force with respect to rotating operation of a steering wheel in an electric power steering unit for a vehicle, the method comprising:

detecting a steering torque of the steering wheel;

generating an inertia compensation control amount to offset an inertia force of the electric motor; and controlling a rotational force of the electric motor based on the detected steering torque and the generated inertia compensation control amount;

wherein the inertia compensation control amount is limited when the detected steering torque and the generated inertia compensation control amount act in opposite directions and the limiting of the inertia compensation control amount is inhibited in accordance with vehicle speed.

* * * * *